H. L. STACY.
CARRIER FOR AUTOMOBILES.
APPLICATION FILED OCT. 21, 1921.
1,437,477.
Patented Dec. 5, 1922.
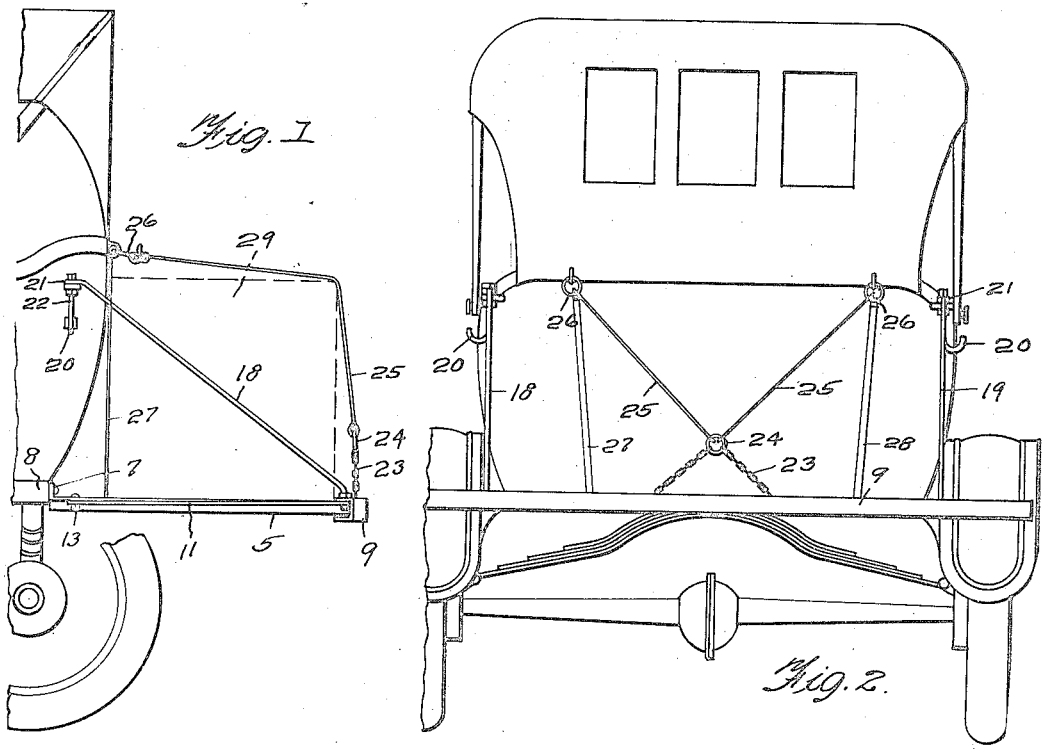
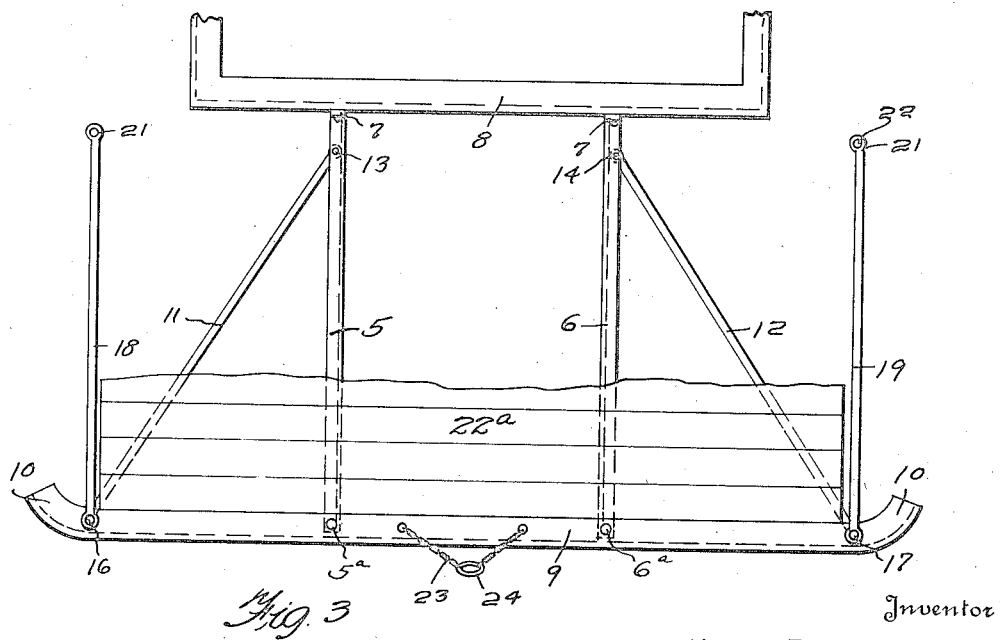
Inventor
Henry L. Stacy, Patented Dec. 5, 1922.

1,437,477

UNITED STATES PATENT OFFICE.

HENRY L. STACY, OF CASPER, WYOMING.

CARRIER FOR AUTOMOBILES.

Application filed October 21, 1921. Serial No. 509,268.

*To all whom it may concern:*

Be it known that I, HENRY L. STACY, a citizen of the United States, residing at Casper, in the county of Natrona and State of Wyoming, have invented certain new and useful Improvements in Carriers for Automobiles, of which the following is a specification, reference being had therein to the accompanying drawings.
This invention relates to a carrier for automobiles and it has for its object to provide a device of simple and economical construction which may be attached to and project from the rear end of an automobile and when in position will serve to carry articles such as trunks, barrels, boxes, camping equipment and many others. The device is so constructed and arranged as to utilize certain parts of the automobile already in existence as points of attachment for the same so that application of the carrier may be made with a minimum of trouble and at a slight expense. Incidentally, the device is so arranged that the rear end thereof constitutes a rear bumper or fender to protect the rear end of the automobile from damage by collision with other objects.

Further objects and advantages of the invention will be set forth in the detailed description which follows.

In the accompanying drawing:

Fig. 1 is a side elevation of the rear portion of an automobile having the attachment connected thereto;
Fig. 2 is a rear view of an automobile with the carrier applied; and Fig. 3 is a plan view of the carrier.

Like numerals designate corresponding parts in all of the figures of the drawing.
The carrier shown in the accompanying drawing has been arranged for attachment to the Ford automobile, but with slight changes it may be connected to other makes of automobiles.
In carrying out the invention I provide two longitudinally extending sills of angle iron designated 5 and 6. The rear ends of these irons are upturned at 7 to adapt them to be bolted to the rear transverse member 8 of the chassis of the automobile. The outer ends of the sills 5 and 6 are connected at 5ª, 6ª, respectively to a transversely extending bumper 9 the ends of which are curved, as indicated at 10, in the usual manner of bumpers. Braces 11 and 12 have their forward ends connected at 13 and 14 with the sills 5 and 6. The outer ends of these braces are connected at 16 and 17 with the outer ends of the bumper 9. Suspension rods 18 and 19 support the outer portion of the frame or carrier from the usual top supports 20 of the automobile. The upper ends of these suspension rods are provided with horizontally disposed eyes 21 which set over the upper ends of the vertical members 22 of the top supports it being only necessary to remove the nut on top of the top support and slip said eye over the top support and replace the nut, in order to connect these suspension rods at their upper ends to the body of the automobile. When the parts have been connected as described, it will be seen that the sills 5 and 6 and braces 11 and 12 constitute a support upon which a barrel, box, trunk or the like may be placed. It is not necessary to provide a floor where large articles, such as barrels and boxes are to be carried, but since it is sometimes desired to carry small articles, the invention contemplates the provision of a light wood floor or platform, indicated at 22ª which may be supported upon the sills 5 and 6 and braces 11 and 12. It will be observed that the suspension rods 18 and 19 lie at such an angle as to constitute means for preventing sidewise movement of a box, barrel or the like mounted upon the carrier. For holding the load in place, I provide a chain 23, ring 24 and rope or cables 25, the latter being adapted to engage with rings or eyes 26 secured along the upper edge of the rear end of the automobile. The invention further contemplates the provision of straps 27 and 28 the upper ends of which are connected to the rings 26 and the lower ends of which are connected to the sills 5 and 6, the function of these straps being to prevent the load, such as the box indicated at 29 from actually making contact with and marring the paint upon the rear end of the automobile.

From the foregoing description it will be seen that the device is one of the utmost simplicity, one that may be manufactured at a very small cost and one which in use will prove of the utmost utility. Many persons have gone to the expense of purchasing trailers to enable them to haul material from time to time without being put to the expense of hiring a team or motor truck. The carrier herein shown and described will in large measure do all that a trailer will do, in so far as the ability to carry boxes, barrels and the like is concerned. Many persons, particularly those living in the suburbs and in the country, find it necessary to occasionally transport a package of considerable size. These persons do not have sufficient use for a team or motor truck to justify them in maintaining such team or motor truck. Upon the other hand it is quite expensive to have to hire a team or truck every time a package is to be hauled. The carrier herein shown and described will be found of the very greatest utility by persons of this class.

The carrier is also of utility in constituting a table upon which repair of tires may be made on the road. This is particularly true where the plateform is employed.

It is to be understood that the invention is not limited to the precise construction set forth but that it includes within its purview whatever changes fairly come within either the terms or the spirit of the appended claims.

Having described my invention what I claim is:

1. A carrier of the character described comprising a frame, means for attaching the inner ends of the frame to a part of an automobile, suspension rods connected to the outer part of the frame and means for connecting said suspension rods to the upper part of the automobile body; eyes along the upper rear edge of the automobile body, vertical straps extending between the frame and said eyes for preventing engagement of the load with the automobile body and flexible means engaged with said eyes and with the rear portion of the frame adapted to extend over the top of the load.

2. A carrier of the character described comprising a pair of longitudinally extending sills having their inner ends bent at right angles to adapt them to be bolted to the rear member of the chassis of an automobile, a transversely extending bumper member secured to the outer ends of said sills, brace bars extending between said sills and the outer portions of said bumper member and inclined suspension bars connected to the outer portion of said bumper member and to the usual top supports of the automobile.

3. A carrier of the character described comprising a pair of longitudinally extending sills, means for connecting the inner ends of said sills to the chassis of an automobile, a transversely extending bumper member connected to the outer ends of said sills, inclined suspension rods the lower ends of which are connected to said bumper and the upper ends of which are provided with means for attaching them to the body of the automobile, eyes upon the upper rear edge of the automobile body, straps extending between the sills and said eyes and lying substantially vertical, flexible elements connected to said eyes at their upper ends and having their lower ends connected to a ring and flexible elements attached at spaced points to the bumper and attached at their upper ends to said ring.

In testimony whereof I hereunto affix my signature.

HENRY L. STACY.